United States Patent [19]

Sambrook

[11] Patent Number: 4,835,132

[45] Date of Patent: May 30, 1989

[54] CATALYST AND METHOD OF MAKING A PRECURSOR FOR THE CATALYST

[75] Inventor: Rodney M. Sambrook, Sheffield, England

[73] Assignee: Dyson Refractories Limited, Sheffield, England

[21] Appl. No.: 7,702

[22] Filed: Jan. 28, 1987

[30] Foreign Application Priority Data

Jan. 29, 1986 [GB] United Kingdom ................ 8602183

[51] Int. Cl.$^4$ ........................ B01J 21/04; B01J 23/06; B01J 23/10; B01J 23/72
[52] U.S. Cl. .................................. 502/303; 502/174; 502/176; 502/178; 502/208; 502/244; 502/304; 502/342
[58] Field of Search ............... 502/176, 178, 244, 303, 502/304, 342, 208, 174; 423/419 P

[56] References Cited

U.S. PATENT DOCUMENTS

| | | | |
|---|---|---|---|
| 3,961,037 | 6/1976 | Davies et al. | 502/342 X |
| 4,436,833 | 3/1984 | Broecker et al. | 502/342 X |
| 4,469,815 | 9/1984 | Sambrook et al. | 502/303 |
| 4,552,861 | 11/1985 | Courty et al. | 502/303 X |
| 4,598,061 | 7/1986 | Schneider et al. | 502/303 |

Primary Examiner—W. J. Shine
Attorney, Agent, or Firm—Caesar, Rivise, Bernstein, Cohen & Pokotilow, Ltd.

[57] ABSTRACT

A CO shift catalyst comprises the calcined form of a precursor of the approximate formula, the precursor having a layer structure $$(Cu+Zn)_6Al_xR_y(CO_3)_{(x+y/2)}OH_{12+2(x+y)}nH_2O$$

where
R is lanthanum, cerium or zirconium
x is not less than 1 and not greater than 4;
y is not less than 0.01 and not greater than 1.5
n is approximately 4.

18 Claims, No Drawings

CATALYST AND METHOD OF MAKING A PRECURSOR FOR THE CATALYST

The invention relates to catalysts, and in particular to CO shift catalysts useful in reactions of the type $$CO + H_2O \rightleftharpoons CO_2 + H_2$$

$$CO + 2H_2 \rightleftharpoons CH_3OH$$

A typical application for the conversion of carbon monoxide to carbon dioxide and water by the water gas shift reaction is in the production of hydrogen or synthesis gas for ammonia production. The reaction is exothermic and hence the lower the operating temperature of the catalyst, the lower the CO content in the product gas. The reaction is facilitated in the presence of a catalyst. It is usual to carry out the conversion in two stages, one at high temperature, typically about 330° C. to about 540° C., the other at low temperature, typically about 190° to about 260°. Each stage requires a catalyst: for high temperature shift it is usual to use a catalyst comprising iron oxide and chromium oxide and for low temperature it is usual to use a catalyst comprising copper, zinc oxide and alumina. While the iron oxide/chromium oxide catalyst will last for several years, the low temperature shift catalysts have a more limited life.

It has now been discovered that by modifying copper-zinc-alumina catalysts, and in particular by replacing a proportion of the alumina by one or more specific additives the catalysts can be of increased stability, in particular thermal stability and hydrothermal stability. The activity of the catalyst is maintained or improved.

A catalyst may be prepared by making a precursor and subjecting that to calcination/reduction prior to use. It is convenient and more meaningful to those skilled in the art to define the catalyst in terms of the formula of the precursor prior to calcination or reduction and that convention will be adopted in this specification.

According to one aspect of the invention there is provided a catalyst comprising the calcined form of a precursor of the approximate formula, the precursor having a layer structure, $$(Cu+Zn)_6Al_xR_y(CO_3)_{(x+y)/2}OH_{12+2(x+y)}nH_2O$$

where
R is lanthanum, cerium or zirconium
x is not less than 1 and not greater than 4;
y is not less than 0.01 and not greater than 1.5
n is approximately 4.

Preferably Cu:Zn is 1:1; R is lanthanum, and X and Y are in the range of 1.5 to 3 and 0.01 and 0.1 respectively. It is further preferred that the atomic ratio of Cu+Zn:Al is 1.5 to 6:1, preferably 1.5 to 4:1, most preferably 3:1 and that the ratio of Cu+Zn:La is 600 to 40:1, preferably about 150:1.

It is possible for part of the copper or zinc or both to be replaced by magnesium to provide a precursor of the approximate formula $$(Cu+Zn)_{6-z}Al_xR_yMg_z(CO_3)_{(x+y)/2}OH_{12+2(x+y)}nH_2O$$

where R, x, y and n are as defined, and z is not less than 0.05 and not greater than 1.

It will be noted that the precursor has a layer structure. By this we mean that there are positively charged brucite like layers e.g. $[(Cu.Zn)_6.Al_2.La(OH)_{16}]$ alternating with negatively charged interlayers e.g. $(CO_3 4-H_2O)^{2-}$. The number and disposition of the hydrotalcite layers will depend on the ratio of $(Cu+Zn):Al$. At the atomic ratio of $(Cu+Zn):Al$ of about 3:1 the precursor will be almost pure hydrotalcite layer compound whereas at higher or lower ratios phases of copper and zinc containing compounds are present. At lower ratios discrete phases free of alumina are formed. Such a precursor when subjected to calcination gives catalysts of desirable surface area, copper crystallite size and pore volume. These lead in turn to high thermal stability and hydrothermal stability.

The proportion of element R should be selected to be the minimum for a beneficial effect, and a maximum below the concentration at which in addition to being present in the precursor the additive forms a discrete layer or phase.

Where the lanthanum is used the lanthanum component may be derived from pure lanthanum salts or mixtures of rare earth salts particularly lanthanum and cerium mixtures in which lanthanum is the major component.

In the formula anions other than the carbonate may be present, examples being nitrate, phosphate.

The precursor may be made in a variety of ways. In one technique, the precursor is made by co-precipitation under controlled conditions of pH and temperature by the addition of alkalis such as sodium carbonate, sodium hydroxide, ammonium bicarbonate or ammonium hydroxide. After precipitation, the material is filtered, washed and dried at elevated temperatures. It has been found that the removal of impurities such as sodium ions may be facilitated if the material is dried at an elevated temperature prior to washing. The washed and dried material is preferably only partially calcined at a temperature of approximately 220° C. to 300° C. prior to forming into a suitable shape for process requirements.

In another aspect the invention provides a method of forming a catalyst as defined by first forming a catalyst precursor and then calcining the precursor, the precursor being formed by co-precipitating copper, zinc, aluminium and the R element from a solution of their salts by reaction with alkali, and recovering the precipitate characterised in that the pH and temperature of the solution are kept substantially constant throughout the reaction so that the precursor formed comprises a layer structure defined above.

The pH of the solution will be about 9, and the temperature about 80° C.

The precursor may be calcined or reduced and used as a catalyst or it may be mounted in a porous carrier, in known manner, the form being chosen to meet the requirements of the particular process. In a much preferred feature of the invention the porous carrier is a preformed low surface area ceramic matrix. In such a case, the catalyst precursor of the invention may be incorporated in a porous ceramic matrix. To achieve this, coprecipitation of the copper, zinc, aluminium and R metals in the porous ceramic matrix may be induced using a homogeneous precipitation technique using a readily hydrolysable material such as urea. In another aspect the invention therefore provides a method of making a catalyst as defined and located in a porous body, comprising introducing a solution of salts of the components within the pores of a preformed low surface area ceramic matrix and decomposing the metal salts to metal oxide or hydroxide form by heating e.g. by calcining, wherein the solution also contains a hydrolysable material and after the solution of salts and hydrolysable material has been introduced into the pores of the ceramic matrix, the body is heated to a temperature suitable for controlled hydrolysis of the hydrolysable material thereby increasing the pH to precipitate the metal components within the pores whereby the metal components are almost exclusively confined to the pores.

Preferably the preformed low surface area ceramic matrix has an apparent porosity in the range 15% to 80% and has a mean pore diameter in the range of 0.1 micron to 20 micron. The matrix may be the wall of a hollow shape such as hollow spheres. The preformed low surface area ceramic matrix may be alpha—alumina but other preformed low surface matrices of ceramic materials such as silicon carbide, aluminosilicates, silica etc., may be used. By the use of this type of carrier the supported catalyst has improved refractoriness and useful life.

The preformed low surface area ceramic matrix may be pretreated with acid or alkali to modify the interaction of the catalytically active material and the ceramic matrix. The surface of the ceramic matrix may also be modified by the addition of "spacer/support" material e.g. alumina within the pores of the ceramic matrix prior to the addition of the active phase. This may be accomplished by the simple impregnation of the ceramic matrix with a soluble salts of the "spacer/support" material, e.g. aluminium nitrate or by using the homogeneous precipitation technique. In each case the temperature of the calcination of the impregnated preformed low surface area ceramic matrix must be carefully controlled to achieve the required surface properties.

Preferably the preformed alpha—alumina matrix is impregnated, under vacuum, with a solution containing nitrate salts of the metal components and also a precipitation agent such as urea. It should be noted that other promoters/spacers such as zirconium may be added, preferably as the nitrate, to further increase the stability and/or improve the selectivity of the catalyst. The zirconium will enter the layer structure or if there is an excess of aluminium will stabilise the alumina structure. After draining of excess solution from the outside of the support the alpha—alumina matrix may be heated to a temperature suitable for the controlled hydrolysis of the urea thus increasing the pH of the absorbed solution and bringing about the deposition of the insoluble hydroxides within the pores. The catalyst is then dried by heating to a suitably elevated temperature.

The metal loading of the catalyst may be increased by repetition of the process steps. Prior to re-impregnation of the catalyst the pores must be opened to remove blocking substances such as urea by-products, nitrogen oxides etc. within the mouth of pores. This may be done by heating i.e. thermal decomposition or the precursor is washed with water or weaker alkaline solution and then dried at a suitably elevated temperature. The catalyst of the required metal loading is subjected to a final calcination temperature of about 450° C.

The catalyst composition of the invention will have enhanced thermal stability and hydrothermal stability. The precursor may contain by-products formed as a result of the method of preparation and these can be tolerated so long as they do not affect the activity of the catalyst or the stability thereof.

In another aspect the invention provides a method of converting carbon monoxide in the presence of steam to carbon dioxide and hydrogen which method comprises passing the mixture over a catalyst of the invention at an appropriate temperature.

The temperature will be of the order of about 190° to 260° C. in the case of a low temperature shift. Because of the high thermal stability and hydrothermal stability the catalyst can be used at higher temperatures and therefore as a substitute for the more usual high temperature shift catalysts.

Copper based catalysts can be used in the low pressure synthesis of methanol, and the invention includes in another aspect a method of converting carbon monoxide and hydrogen into methanol which comprises passing the mixture over a catalyst of the invention at a temperature of the order of about 240° C. at a pressure of about 5 MPa to about 10 MPa.

In order that the invention may be well understood it will now be described by way of example with reference to the following example.

Example

An aqueous solution was made of 100 gms of cupric nitrate trihydrate, 150 gms of zinc nitrate hexahydrate and 110 gms of aluminium nitrate nonahydrate. A molar solution was made of sodium carbonate. The nitrate solution was fed at the rate of 16 ml/min into a 5 liter beaker containing 0.5 liters of deionised water at 80° C., and the sodium carbonate solution was added at a rate to maintain the pH constant at a value of 9. The solution was kept at 80° C. for one hour after complete precipitation. The precipitate was filtered using a 24 cm diameter Buchner funnel and two paper filters. The precipitate was washed twice by resuspending the precipitate in 2.5 liters of deionised water at 80° C. and then filtering. The filtered precipitate was dried in an oven at 267° C. overnight. The precipitate was partly calcined as a result and then washed substantially free of sodium ions. The material was dried and calcined at about 357° C.

The method was repeated using a nitrate solution containing additionally 5 gms of lanthanum nitrate hexahydrate.

The total surface area was measured using the B.E.T. method and the following results were obtained

| calcination temperature | total surface area $M^2/gm$ of catalyst | |
| --- | --- | --- |
|  | Cu/Zn/Al | Cu/Zn/Al/La |
| 357° C. | 93.38 | 83.0 |
| 460° C. | 37.0 | 79.0 |
| 600° C. | 12.0 | 69.0 |

These results show that the lanthanum containing catalyst was very much more stable than the lanthanum-free product. Analysis showed that the Cu/Zn/Al/La catalyst had a layer structure. When used in CO shift processes, both in the water gas shift reaction and the preparation of methanol, the catalyst displayed great stability.

I claim:

1. A catalyst comprising the calcined form of a precursor, the precursor comprising copper, zinc and aluminum wherein the precursor is of the approximate formula, $$(Cu+Zn)_6Al_xR_y(CO_3)_{(x+y)/2}OH_{12+2(x+y)}nH_2O$$

where
R is lanthanum, cerium or zirconium
x is in the range of 1.5 to 3;
y is not less than 0.01 and not greater than 1.5
n is approximately 4 and has a hydrotalcite layer structure.

2. A catalyst according to claim 1, wherein Cu:Zn is 1:1; R is lanthanum, and y is 0.01 to 0.1.

3. A catalyst according to claim 1 wherein part of the copper or zinc or both is replaced by magnesium to provide a precursor of the formula $$(Cu+Zn)_{6-z}Al_xR_yMg_z(CO_3)_{(x+y)/2}OH_{12+2(x+y)}nH_2O$$

where R, x, y and n are as defined, and z is not less than 0.05 and not greater than 1.

4. A catalyst according to claim 1, wherein the atomic ratio of (Cu+Zn):Al is about 1.5 to 4:1.

5. A catalyst according to claim 1, wherein the proportion of element R is between the minimum for a beneficial effect, and a maximum below the concentration at which the element forms a discrete layer or phase.

6. A catalyst according to claim 5, wherein the element La is present in a ratio of Cu+Zn:R of 600 to 40:1.

7. A catalyst according to claim 1, wherein anions other than the carbonate selected from the group consisting of nitrate and phosphate, are present.

8. A method of making a precursor for catalyst, said precursor being of the approximate formula, $$(Cu+Zn)_6Al_xR_y(CO_3)_{(x+y)/2}OH_{12+2(x+y)}nH_2O$$

where
R is lanthanum, cerium or zirconium
x is in the range of 1.5 to 3;
y is not less than 0.01 and not greater than 1.5
n is approximately 4 and having a layer structure, said method comprising causing co-precipitation from corresponding salt solutions of Cu, Zn, Al and the R element at substantially constant pH and temperature by the addition of alkalis.

9. A method according to claim 8, wherein the pH is substantially 9.

10. A method according to claim 9, wherein the material is dried at an elevated temperature prior to washing, and partially calcined at a temperature of approximately 300° C.

11. A method of making a precursor for catalyst, said precursor being of the approximate formula, $$(Cu+Zn)_6Al_xR_y(CO_3)_{(x+y)/2}OH_{12+2(x+y)}nH_2O$$

where
R is lanthanum, cerium or zirconium
x is in the range of 1.5 to 3;
y is not less than 0.01 and not greater than 1.5
n is approximately 4 and having a hydrotalcite layer structure, said method comprising introducing a solution of salts of the Cu, Zn, Al and R, and a hydrolysable material into the pores of a preformed body of low surface area ceramic matrix, and heating the body to a temperature to bring about controlled hydrolysis of the hydrolysable material thereby increasing the pH to precipitate species to the metals Cu, Zu, Al and R within the pores whereby the species are almost exclusively confined to the pores.

12. A method according to claim 11, wherein the preformed low surface area ceramic matrix has an apparent porosity in the range 15% to 80% and has a mean pore diameter in the range of 0.1 micron to 20 micron.

13. A method according to claim 11, wherein the preformed low surface area matrix is alpha—alumina or a ceramic material selected from the group consisting of silicon carbide, alumino-silicates, and silica.

14. A method according to claim 11, wherein the preformed low surface area ceramic matrix is pretreated with acid or alkali to modify the interaction of the catalytically active material and the ceramic matrix.

15. A method according to claim 11, wherein the preformed low surface area ceramic matrix is impregnated, under vacuum.

16. A method according to claim 11, wherein promoters/spacers are added.

17. A method according to claim 11, wherein excess solution is drained from the outside of the matrix which is then heated to a temperature suitable for the controlled hydrolysis of the urea which is selected as the hydrolysable material thus increasing the pH of the absorbed solution and bringing about the deposition of the insoluble hydroxides within the pores.

18. A method according to claim 11, wherein the metal loading of the catalyst is increased by repetition of the process steps and prior to re-impregnation of the catalyst the pores are opened to remove blocking substances by heating.

* * * * *